Jan. 9, 1934.   J. RATHMILL   1,942,773
DEVICE FOR SUBDIVIDING VEGETABLES AND THE LIKE MATERIALS
Filed Aug. 13, 1932   2 Sheets-Sheet 1

Inventor:
Joseph Rathmill
By his Attorney: Walter Gunn

Jan. 9, 1934.   J. RATHMILL   1,942,773
DEVICE FOR SUBDIVIDING VEGETABLES AND THE LIKE MATERIALS
Filed Aug. 13, 1932   2 Sheets-Sheet 2

Inventor:
Joseph Rathmill
By his Attorney: Walter Gunn

Patented Jan. 9, 1934

1,942,773

UNITED STATES PATENT OFFICE 1,942,773

DEVICE FOR SUBDIVIDING VEGETABLES AND THE LIKE MATERIALS

Joseph Rathmill, Warrington, England, assignor of one-half to Thomas M. Nutbrown, Limited, Blackpool, England Application August 13, 1932, Serial No. 628,650, and in Great Britain August 28, 1931

2 Claims. (Cl. 146—160)

This invention relates to a manually operable device for subdividing vegetables or the like material and especially potatoes.

In such devices it is known to provide a cutter member which may be formed with intersecting blades and a member adapted to press the vegetables to be cut, such as potatoes, thereagainst the latter member if desired being formed with projections to intersect with the blades of the cutter and extrude the cut vegetables therefrom.

According to the present invention there is provided a device having two presser members each provided with two fixed pivot supports in the neighbourhood of the extremities of one side and two pivot guides projecting from the neighbourhood of the extremities of the opposite side, such presser members being connected together by two pairs of crossed levers, the elements of each pair being pivoted together at the point of crossing and each being pivoted respectively to one of the fixed pivot supports on one presser member and to one of the pivot guides on the other presser member whereby upon angular displacement of the elements of the respective pairs of levers the presser elements are relatively displaced in parallel planes and characterized by the fact that one presser member is provided with cutter blades while the other presser member is provided with projections which extrude the cut vegetable from between the blades of the cutter. The corresponding elements of each pair of levers may be connected together by handles or handles may be formed on one of the presser members itself.

Preferably the upper presser member carries or constitutes the cutter while the lower presser member carries or constitutes the extrusion member.

In a preferred form of the invention one presser member is arranged in known manner as a cutter by forming a grid of vertical strips of metal which constitute the blades, mounted within a frame composed of four vertical strips of metal. The cutter strips intersect so as to form a large number of quadrilaterals, preferably squares. For this purpose, the vertical strips which constitute the blades are half cut through at their intersections and secured at their ends to the strips which constitute the frame.

A further feature of the invention consists in cutting away or notching the ends of the blades so that they will be engaged and held in position by the members of the frame. Upon tinning the cutter, the blades are fixed more firmly to each other and to the frame.

A preferred form of the invention is illustrated in the accompanying drawings in which:—

Figure 1:
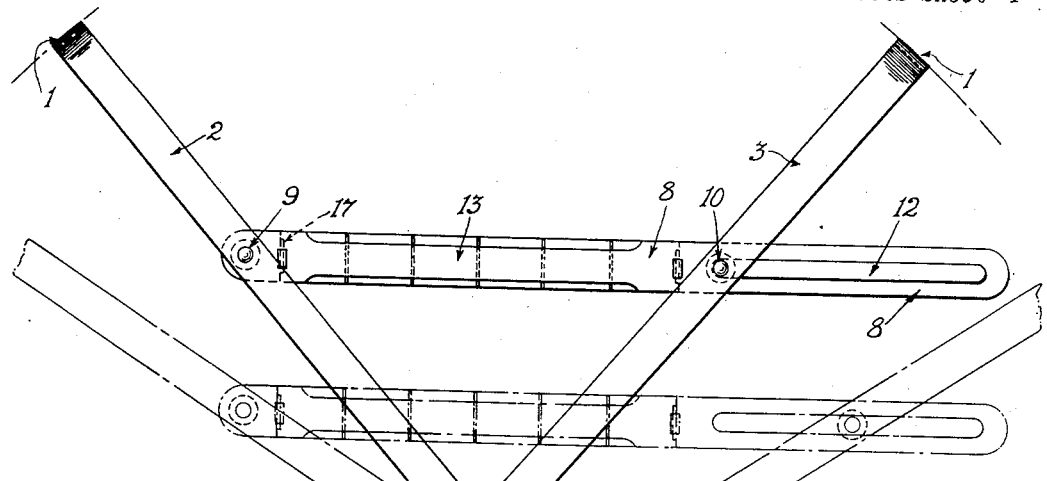
Figure 1 is a side elevation of the device showing the cutter raised and, in dotted lines, partly displaced.

In the drawings the pairs of levers 2, 3 and 2', 3' are pivoted together at 7 and 7' respectively. They are also pivoted to the side members 4 of the lower presser member as shown at 5 and 6 and to the side members 8 of the upper presser member, which constitutes the cutter, as shown at 9 and 10. The side members 4 of the lower presser member and the side members 8 of the upper presser member are extended and provided with pivot guides in the form of slots as shown at 11 and 12 in which the pivots as at 5 and 10 respectively can slide. The levers 2, 2' and 3, 3' are connected together respectively by handles 1 so that when these handles 1 are depressed, the cutter 13 is brought down towards the base and maintained parallel therewith.

Figure 2:
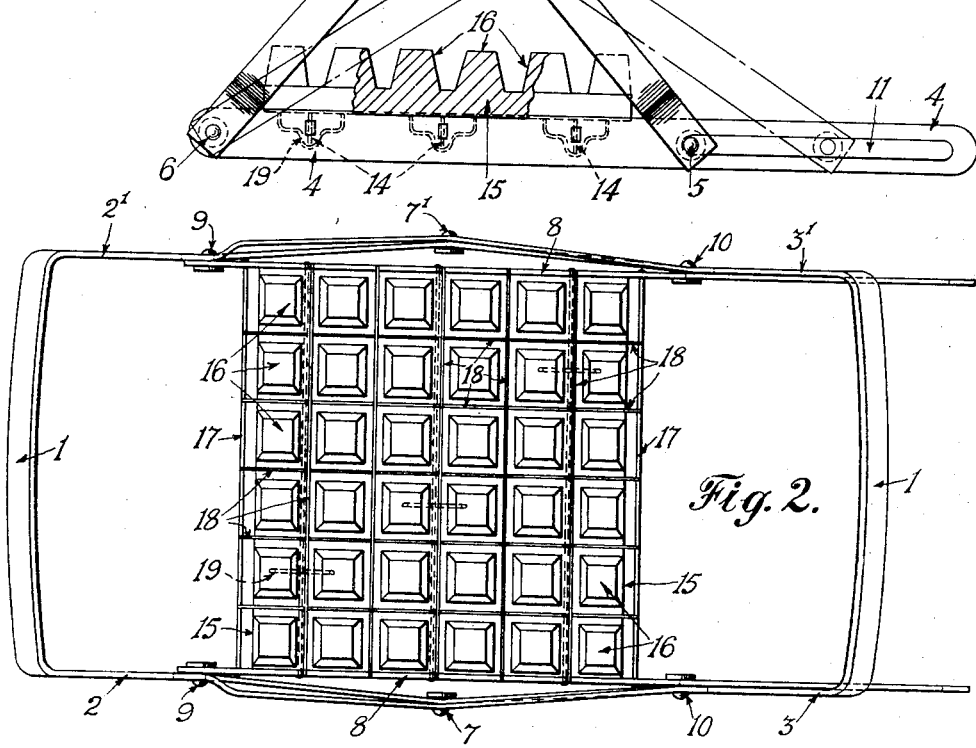
Fig. 2 is a plan view of the device showing the cutter raised.
Figure 3:
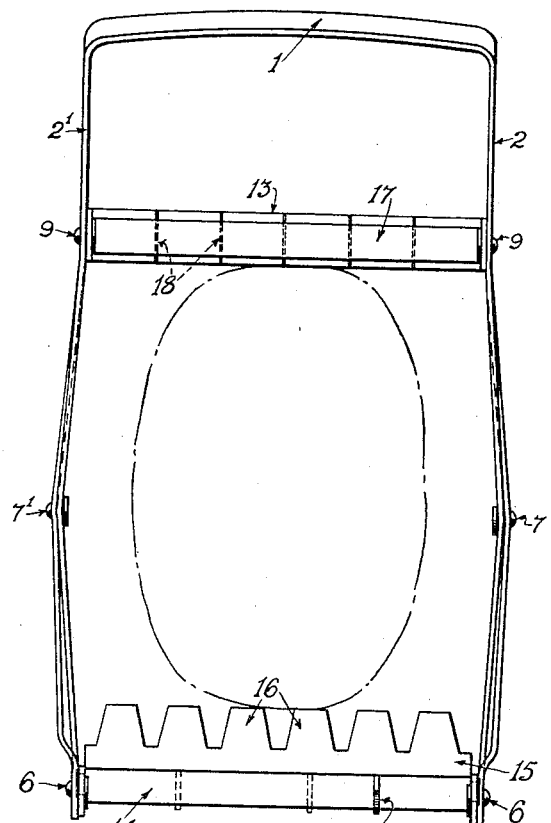
Figure 3 is a front elevation of the device showing the cutter raised.
Figure 4:
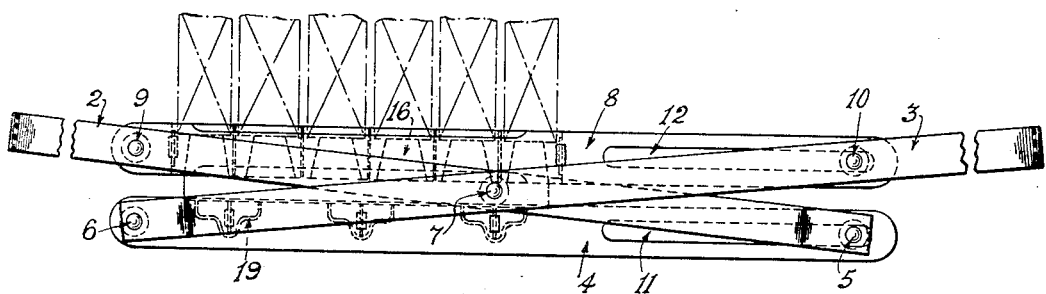
Figure 4 is a side elevation showing the cutter displaced.

The side rails 4 of the lower presser member are preferably connected together by three transverse strips 14 which act as the supports for an extrusion member 15 provided with a plurality of projections 16 adapted to pass between the blades of the cutter 13. As shown in Fig. 2 the side walls 8 of the cutter are connected by end walls 17 and the frame formed by the walls 8 and 17 carries a plurality of blades 18. The blades 18 are preferably secured by cutting away a portion of their ends so that they overlap the walls 8 and 17 under and over. The blades 18 are also half cut through at their intersections and are preferably tinned after being built up into the frame.

Figure 5:
Figure 5 is a side elevation of a modified form of extrusion member.

The extrusion plate 15 may be of wood, or of any other suitable material, for example a synthetic resin such as a phenol formaldehyde condensation product. It may be in the form of a solid body as shown in Fig. 1 or may be a thin pressed-out sheet, or moulded shell. It may also be made, for example of sheet metal or of hard rubber. It may be secured by staples 19 as shown in Fig. 1 and may, if desired, be slotted on its under-surface as shown at 20 in Fig. 5 for the accommodation of the transverse strips 14 of the presser member 4. If desired, the underface of the extrusion member 16 may be provided with projections adapted to engage the side members 4 of the lower presser member, or the transverse members 14, or both. For example, such projections may be formed at the corners to ensure correct positioning of the extrusion member 16 with reference to the cutter.

Preferably the whole device with the exception of the extrusion member is formed of a strip steel which may be tinned immediately after forming the parts, but prior to assembling the pivot studs and rivets.

The handles 1 may be covered with or formed of wood, or synthetic resin or other similar material.

If desired, the extrusion member may be carried by the upper presser member and the cutter plate carried by the lower presser member, in which case the device may be mounted upon legs to enable the sub-divided vegetable to be collected from beneath the cutter.

The handles may be directly attached to the upper presser member instead of being secured to the arms 2, 3, 2′ and 3′.

As illustrated in the drawings the projections upon the extrusion member 15 are square in cross-section to conform with the squared apertures between the blades of the cutter. If desired, however, the cutter may be arranged to cut the vegetable in other shapes in which case the extrusion member will have correspondingly shaped projections thereon. Preferably, however, the projections are tapered somewhat as shown in Fig. 1.

What I claim is:—

1. In a portable hand cutter for potatoes and like rigid-foodstuffs comprising upper and lower opposed presser members, one carrying crossed knives with quadrilateral spaces between them and the other carrying an extrusion member with quadrilateral projections to pass into such spaces, and crossed pivoted levers connecting the presser members together, a lower presser member in the form of two longitudinal strips of ribbon metal, cross-strips notched into and connecting together the longitudinal strips and staples in the back of the extrusion member shaped and positioned so as to encircle the cross-strips and hold the extrusion member to the presser member, and grooves in the back of the extrusion member in which the cross-strips lie.

2. In a portable hand cutter as claimed in claim 1, an upper presser member in the form of two longitudinal strips of ribbon metal, two cross-strips notched into and connecting together the longitudinal strips, cross-knives also notched into the longitudinal members, and longitudinal knives intersecting and in the plane of the cross-knives and carried by the cross-strips.

JOSEPH RATHMILL.